Sept. 15, 1959  J. H. SENG  2,904,350
IMPLEMENT MOUNTING COUPLING
Filed April 17, 1956  3 Sheets-Sheet 1

INVENTOR.
James H. Seng.
BY
Fishburn and Gold
ATTORNEYS.

Sept. 15, 1959    J. H. SENG    2,904,350
IMPLEMENT MOUNTING COUPLING
Filed April 17, 1956    3 Sheets-Sheet 2
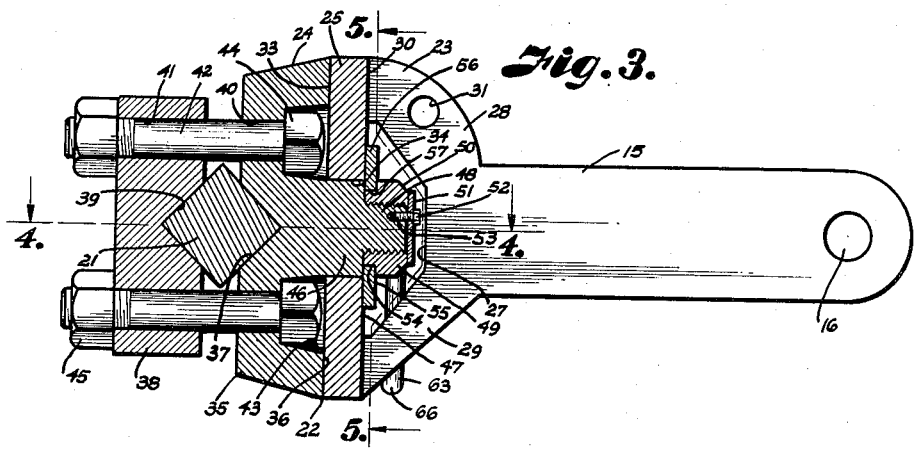
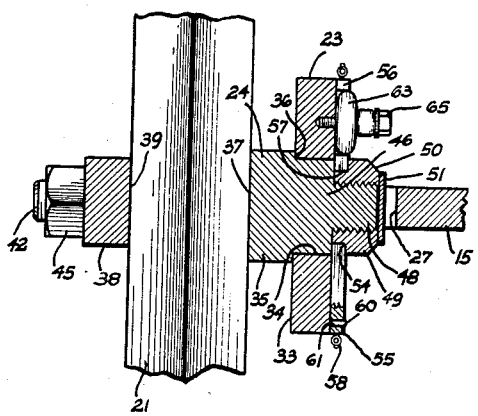
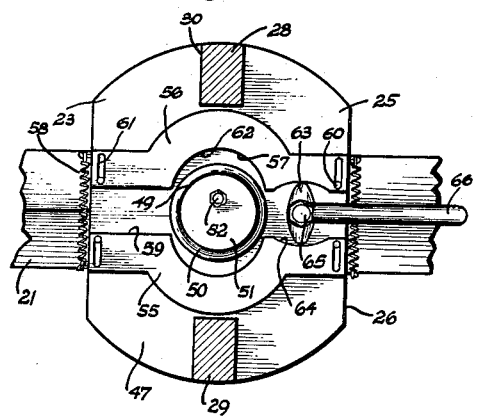
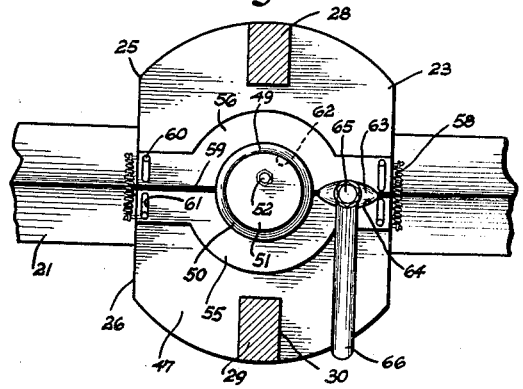
INVENTOR.
James H. Seng.
BY
Fishburn and Gold
ATTORNEYS.

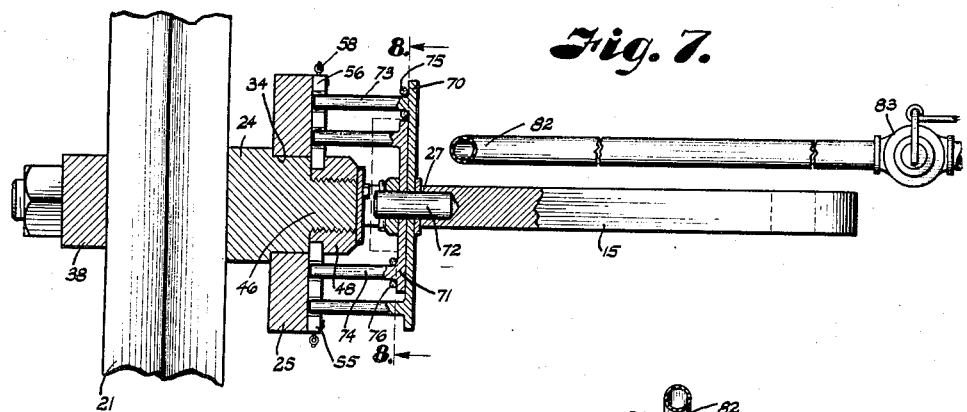

United States Patent Office 2,904,350
Patented Sept. 15, 1959

2,904,350

IMPLEMENT MOUNTING COUPLING

James H. Seng, Salina, Kans.

Application April 17, 1956, Serial No. 578,659

3 Claims. (Cl. 280—510)

This invention relates to coupling devices for connecting tractors or draft members thereon to structures to be trailed therebehind, and more particularly to a novel semi-automatic quick coupling device for connecting or mounting implements on a tractor.

Conventional farm tractors and the like have hydraulically actuated lifts and/or attachments adapted to be connected to agricultural implements for towing the implement and for raising and lowering the implements relative to the ground. Such equipments are usually designed whereby an implement may be disconnected and of many other different implements attached and used behind the tractor for various work required to be done. A number of fastening devices such as pins, bolts and the like, usually must be removed and replaced in changing from one implement to another which work is time-consuming and also difficult due to the necessity of lifting and moving portions to correct alignment for insertion of each of the pins, bolts and the like.

The objects of the present invention are to provide a semi-automatic coupling for tractors and implements that eliminates the difficulties experienced with conventional connecting devices; to provide such a coupling that automatically functions to produce a locking engagement when the parts are brought together; to provide such a coupling that permits relative rotation of the connected parts about an axis extending longitudinally of the direction of movement of the tractor; to provide such a coupling with lock releasing structure which when released permits the parts to be drawn apart; to provide such a coupling with a lift device whereby the operation of the lift device will raise and lower an implement connected thereto; and to provide a swivel coupling structure that is simple and practical in construction, economical to manufacture and efficient in operation.

In accomplishing these and other objects of the present invention, I have provided improved details of structure, the preferred forms of which are illustrated in the accompanying drawings, wherein:

Fig. 3 is a side elevation of the coupling with the parts connected together and portions broken away to illustrate the engagement thereof.

Fig. 4 is a horizontal sectional view taken on the line 4—4, Fig. 3.

Fig. 5 is a transverse sectional view through the coupling on the line 5—5, Fig. 3 with the lock members in closed position.

Fig. 6 is a transverse sectional view through the coupling similar to Fig. 5 with the lock members in open position.

Fig. 7 is a longitudinal sectional view through a modified form of coupling.

Fig. 8 is a transverse sectional view through the modified form of coupling on the line 8—8, Fig. 7 with the lock members in closed position.

Fig. 9 is a transverse sectional view similar to Fig. 8 with the lock members in open position.

Figure 1:
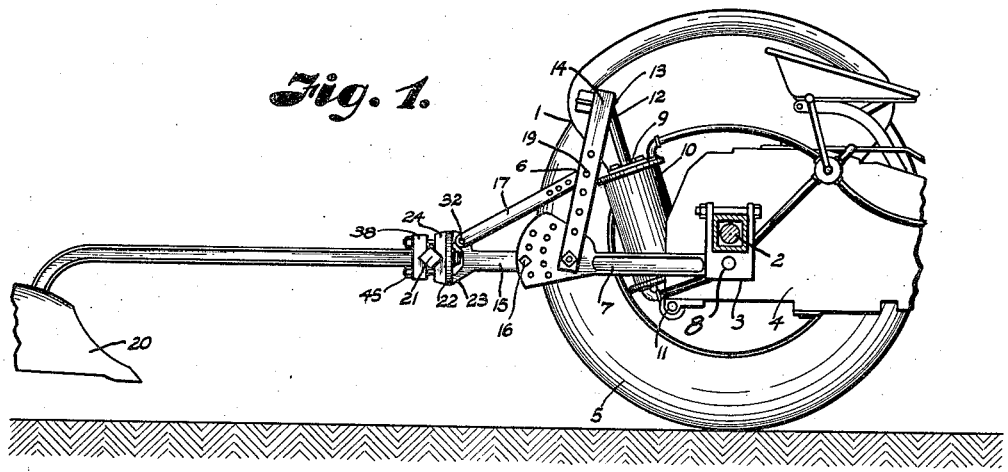
Fig. 1 is a side elevational view of a fragmentary rear portion of a tractor and a tractor-towed implement with a coupling illustrative of the invention interposed between the mounting mechanism of the tractor and the implement.

Referring more in detail to the drawings:

1 designates a tractor which may be any one of several types of existing farm tractors and having a rear axle 2 including a differential mechanism enclosed in a suitable housing 3 connected to transmission mechanism enclosed in a housing 4 and rear wheels one of which is indicated at 5 mounted at each end of the axle 2. A lift mechanism 6 is carried by the tractor and has spaced arms 7 pivotally mounted as at 8 on the axle and extending rearwardly therefrom. One or more cylinders 9 of extensible hydraulic members 10 are pivotally mounted as at 11 with the piston rods 12 connected to a lift bar 13 which extends transversely of the tractor above the arms 7. The lift bar 13 is adjustably connected to the arms 7 by means of struts 14. The arms 7 each have a rearward extension 15 connected thereto as at 16 for vertical swinging movement, said extensions 15 being connected by links 17 to the struts 14 in spaced relation to the pivots 16, the links 17 preferably having a plurality of openings longitudinally spaced therein for receiving fastening devices 19 to adjustably connect the extensions 15 with the struts 14 to adjust the angular relationship between the arms 7 and the extensions 15, the lift structure being such that actuation of the hydraulic extensible means will raise and lower the arms 7 relative to the ground.

The structure of the lift and operation thereof is substantially as disclosed in the Seng Patent No. 2,658,438, issued November 10, 1953.

20 designates an implement illustrated as being a plow connected to and extending rearwardly from a transversely arranged tool bar 21 or the like, the plow 20 and tool bar 21 being for illustration only and representing any structure which may be trailed behind the tractor or other vehicle to which it is coupled by one or more coupling structures 22 now to be described.

The coupling structures 22 each include separable portions 23 and 24, the portion 23 being at the rear portion of an arm extension 15 and the portion 24 being secured to the tool bar 21; when the lift structure includes two arm extensions, there would be coupling structures at the end of each and connected to the tool bar 21 in spaced relation whereby the level of the tool bar may be controlled as it is raised and lowered by the lift mechanism. However, a single coupling structure 22 may be utilized when it is not desired to control the relative rotation of the coupling parts 23 and 24. The coupling member 23 includes a plate portion 25 generally circular in shape but preferably having side portions cut off as at 26 for lightness in weight. The plate 25 is preferably substantially perpendicular to the arm extension 15 and is spaced from the rear end portion 27 thereof and is supported on the arm extension 15 by upper and lower diverging fingers 28 and 29 extending rearwardly from the arm extension 15 with their ends suitably secured as by welding to the plate portion as at 30, the spacing between the rear portions of the fingers 28 and 29 and the plate 25 and rear end 27 of the arm extension 15 being sufficient for location of lock members and a portion of the coupling member 24 as later described. In the illustrated structure, the finger 28 has an aperture 31 therein for receiving a fastening device 32 for connecting the link 17 with the arm extension 15. The plate member 25 has a flat face 33 on the opposite side thereof to the arm extension 15 and has an axial through cylindrical bore 34 extending therethrough.

The coupling member 24 includes a bar portion 35 having a forward face 36 adapted to engage the rear face 33 of the plate member 25. The rear portion of the bar member 35 is provided with a V-notch 37 adapted to receive one edge of the tool bar 21 and a clamp cap 38 is disposed on the opposite side of the tool bar and has a V-notch 39 receiving the opposite edge of the tool bar. The bar 35 and clamp cap 38 have spaced aligned apertures 40 and 41 respectively for receiving fastening devices such as bolts 42 for firmly clamping the tool bar between the bar 35 and cap 38. In the illustrated structure, the bar 35 has counter bores 43 axially aligned with the apertures 40 for receiving the heads 44 of the bolts 42 and nuts 45 are threaded on the ends of the bolt shanks at the rear of the clamp caps 38, the counter bores 43 being of sufficient depth whereby the heads 44 will not project beyond the face 36 of the bar 35. The bar 35 has a pivot post or cylindrical shaft 46 extending from the central portion of the face 36 and perpendicular thereto, said post 46 being adapted to extend into the bore 34 and be rotatable therein but having substantially no lateral movement relative thereto. The end of the shaft 46 terminates in substantially the same plane as the forward face 47 of the plate member 25 when the coupling members are connected and said shaft is provided with a coaxial externally threaded extension 48 on which is threaded a cylindrical nut 49 of the same or slightly less diameter than the shaft 46 with the forward end of said nut being beveled as at 50 to facilitate insertion of same into the bore 34. The nut 49 is preferably held in place by means of a keeper plate 51 secured to the threaded extension 48 by means of a screw 52 threaded into a threaded socket 53. The nut 49 adjacent the end of the shaft 46 is preferably provided with a reduced diameter which cooperates with the end of the shaft 46 to provide a groove 54 for receiving portions of lock members or jaws 55 and 56 carried on the plate 25. The lock members 55 and 56 are preferably flat bars having arcuate portions 57 at the mid-portion thereof, the lock members being mounted on the plate member 25 in engagement with the face thereof opposite the face 33. The end portions of the lock members are connected by tension springs 58 which tend to draw adjacent edges 59 of the lock members together, the lock members being guided in their path of movement by pins 60 which extend through elongated slots 61 adjacent the ends of the lock members and in planes in alignment with the direction of movement of the lock members, the pins 60 being suitably secured to the plate 25. When the lock members or jaws are drawn together, a central portion thereof defines a bore 62 approximately the same diameter as the bottom of the groove 54, the lock members 55 and 56 being of a thickness slightly less than the width of the groove 54 whereby said lock members will enter the groove to retain the coupling parts in connected position.

Figure 2:
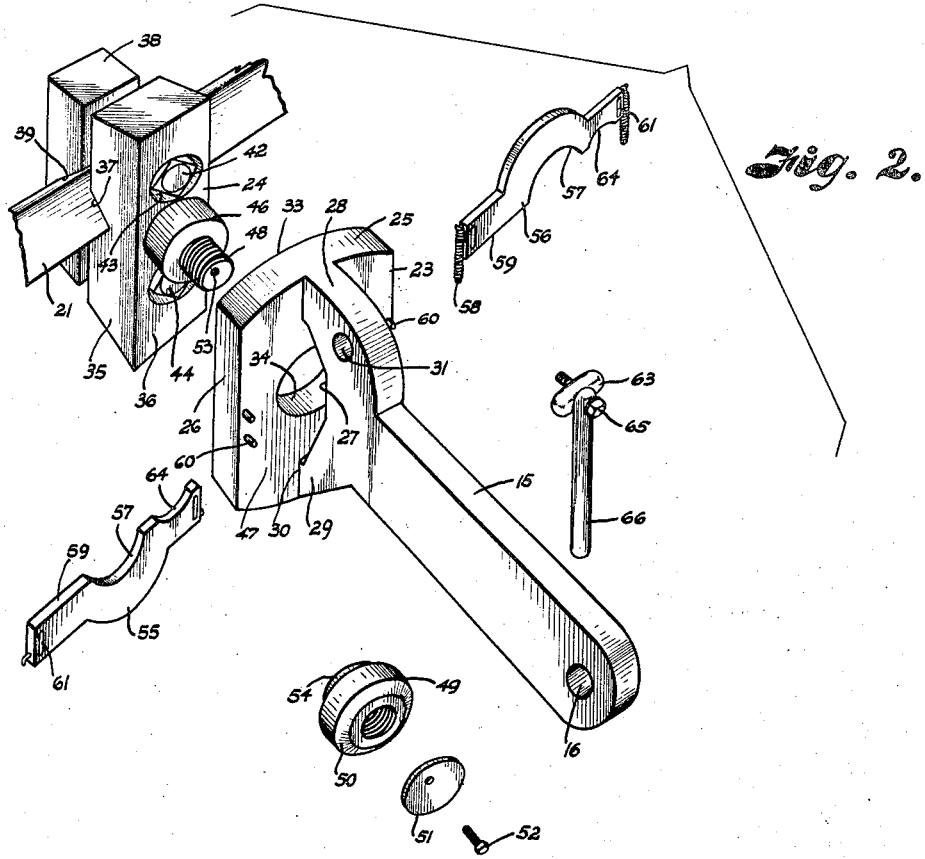
Fig. 2 is a disassembled perspective view of the portions of the coupling.

In the form of the invention illustrated in Figs. 1 to 6 inclusive, the lock members 55 and 56 are manually spread or opened by means of an elongated cam member 63 positioned in recesses 64 in the adjacent faces 59 of the lock members at one side of the bore 62, the cam member 63 being pivotally mounted on a pivot member 65 secured to the plate 25. The cam member 63 has a handle 66 extending therefrom whereby swinging of the handle rotates the cam member 63 to spread the lock members as illustrated in Fig. 6.

In using a coupling constructed as described, with the coupling portion 24 secured to a tool bar 21 or other trailing member and the arm extensions 15 secured to the arms 7, the lift mechanism is operated to position the arm extensions 15 in a substantially horizontal position and the tool bar 21 is supported whereby the shafts 46 are substantially in a horizontal position and in alignment with the bores 34. Then the tractor is backed whereby the nuts 49 enter the bores 34 and continued movement causes the bevels 50 to engage the lock members 55 and 56 spreading same apart and allowing the coupling members 24 and coupling member 23 to be moved together to substantially engage the faces 33 and 36. Then the springs 58 pull the lock members 55 and 56 together whereby they enter the grooves 54 to hold the coupling members in a connected position. The tractor can then be operated to tow the implement or other trailing device connected to the coupling members 24. Also, the coupling members 24 may swivel relative to the coupling members 23 as the shafts 46 will rotate in the bores 34 and the engagement of the shafts in the bores 34 prevents lateral movement, and the engagement of the faces 33 and 36 and the locking members 55 and 56 in the groove 54 substantially eliminates relative longitudinal movement of the coupling members. When it is desired to disconnect the coupling members, the handles 66 on the cams 63 are swung to spread the lock members 55 and 56 to open same sufficiently whereby forward movement of the tractor will pull the coupling members 23 from the shafts 46 and nuts 49.

In the form of the invention illustrated in Figs. 7 to 9 inclusive, the coupling member 24, shaft 46, nuts 48 and their assembly and the arm extension 15, plate 25 and its mounting on the arm extension, and the lock members 55 and 56 and the mountings thereof, are substantially the same as shown and described in connection with the structure illustrated in Figs. 1 to 6 inclusive, the modification being in the structure for operating the lock members. Lever arms 70 and 71 are pivotally mounted on a pin 72 secured in and extending from the end 27 of the arm extension 15, the pin 72 being coaxial with the bore 34. Each of the arms 70 and 71 have pins 73 and 74 respectively adjacent the ends thereof and extending from the respective levers between adjacent faces 59 of the lock members 55 and 56 in spaced relation to the bore 62 therethrough. The lever 70 is longer than the lever 71 whereby the pins 73 are spaced further from the pin 72 than the pins 74. One end of the lever 70 is connected to a finger 75 and one end of the lever 71 is connected to a finger 76 spaced from the finger 75 and on the opposite side of the pin 72 therefrom, the fingers 75 and 76 being a portion of a forked rod 77 which is connected to a diaphragm 78 supported in a diaphragm housing 79 to define chambers 80 and 81. The chamber 81 has communication through a duct 82 with a source of vacuum with suitable valve 83 in the duct for controlling the application of vacuum to the chamber 81 and diaphragm 78, the source of vacuum being a vacuum pump (not shown) or other suitable mechanism on the tractor. The valve 83 is such that the operator may selectively connect the chamber 81 to a source of vacuum or vent the chamber to the atmosphere. A spring 84 is arranged in the housing 79 to aid the springs 58 in returning the levers 70 and 71 to a position for closing of the lock members 55 and 56. The diaphragm housing 79 is preferably supported by a bracket 85 on the finger 28 or other suitable location preferably fixed relative to the plate 25.

In using a strucutre assembled as described and shown in Figs. 7 to 9 inclusive, the valve 83 is actuated to apply a vacuum to the chamber 81 to supply sufficient force to the diaphragm 78 to move the rod 77 and fingers 75 and 76 thereon away from the pin 72 to swing the levers 70 and 71 thereon whereby the pins 73 and 74 acting against the faces 59 of the lock members 55 and 56 spread said lock members sufficiently whereby the bore 62 is larger than the nut 49 to permit the tractor to be moved from the implement and separate the coupling members 23 and 24. The valve is then actuated to cut off the source of vacuum and vent the chamber 81 to the atmosphere whereby the springs 84 and 58 return the levers 70 and 71 and the lock members 55 and 56 to closed or locking position. The coupling members 23 and 24 are connected in the same manner as described relative to the structure shown in Figs. 1 to 6 inclusive in that the shaft 46 is aligned with the bore 34 and the portions moved toward each other whereby the nut 49 is inserted through the bore 34 spreading the lock members 55 and 56 until they align with the groove 54 at which time the springs 53 move the lock members into the groove to complete connection of the coupling members 23 and 24.

It is to be understood that while I have illustrated and described certain forms of my invention, it is not to be limited to the specific forms or arrangement of parts herein described and shown except insofar as such limitations are included in the claims.

What I claim and desire to secure by Letters Patent is:

1. A coupling device comprising two cooperating parts for operatively connecting a tractor with a trailing structure, one of said parts including a plate member, an arm extending from said plate member for pivotal connection to a tractor, means on the tractor and connected with the arm and operative for effecting swinging movement of said arm and said one part, said plate member having a through cylindrical axial bore, a pair of jaws movably mounted on the plate member for relative movement toward and away from each other, resilient means engaged with said jaws for urging said jaws toward each other, said jaws when urged together having portions cooperating and defining a bore coaxially of said axial bore and in axial alignment therewith and smaller in diameter than said axial bore, the other of said cooperating parts having a portion for engaging the plane face on said one part on the opposite side thereof from the jaws, means on said other cooperating part for operatively connecting same to a trailing structure, a central cylindrical post extending from said other part and through said axial bore for rotatably supporting said other part on said one part, said post having an annular groove therein for receiving the jaws when said other part engages said one part whereby the jaws retain said parts in connected position, levers pivotally mounted on the arm for swinging movement about an axis coaxial with the axial bore, means on the levers operatively engaging the jaws on opposite sides of the axial bore whereby swinging movement of the levers move said jaws, a diaphragm member, means communicating the diaphragm member with a source of differential fluid pressure for moving the diaphragm, and means connecting the diaphragm with the levers whereby application of fluid pressure to the diaphragm swings the levers to move the jaws apart and out of the groove in the post for releasing the parts for separation.

2. A coupling device comprising two cooperating parts for operatively connecting a tractor with a trailing structure, one of said parts including a plate member having opposite substantially parallel plane faces, an arm extending from one of said plane faces for pivotal connection to a tractor, means on the tracor and connected with the arm and operative for effecting swinging movement of said arm and said one part, said plate member having a through cylindrical axial bore perpendicular to said parallel faces, a pair of jaws movably mounted on the plate member and engaging the face thereof from which the arm extends for relative movement toward and away from each other, resilient means engaged with said jaws for urging said jaws toward each other, said jaws when urged together having portions cooperating and defining a bore coaxially of said axial bore and in axial alignment therewith and smaller in diameter than said axial bore, the other of said cooperating parts having a face for engaging the plane face on said one part on the opposite side thereof from the jaws, means on said other cooperating part for operatively connecting same to a trailing structure, a central cylindrical post extending from the face of said other part and through said axial bore for rotatably supporting said other part on said one part, said post having an annular groove therein spaced from the face on said other part for receiving the jaws when the face of said other part engages the respective face of said one part whereby the jaws retain said parts in connected position, levers pivotally mounted on the arm for swinging movement about an axis coaxial with the axial bore, means on the levers operatively engaging the jaws on opposite sides of the axial bore whereby swinging movement of the levers move said jaws, a diaphragm member, means communicating the diaphragm member with a source of differential fluid pressure for moving the diaphragm, and means connecting the diaphragm with the levers whereby application of fluid pressure to the diaphragm swings the levers to move the jaws apart and out of the groove in the post for releasing the parts for separation.

3. A coupling device comprising two cooperative parts for operatively connecting a tractor with a trailing structure, one of said parts including a plate member, an arm extending from said plate member for pivotal connection to a tractor, means on the tractor and connected with the arm and operative for effecting swinging movement of said arm and said one part, said plate member having a through cylindrical axial bore, a pair of jaws movably mounted on the plate member for relative movement toward and away from each other, resilient means engaged with said jaws for urging said jaws toward each other, said jaws when urged together having portions cooperating and defining a bore coaxially of said axial bore and in axial alignment therewith and smaller in diameter than said axial bore, means on said other cooperating part for operatively connecting same to a trailing structure, a central cylindrical post extending from said other part and through said axial bore for rotatably supporting said other part on said one part, said post having an annular groove therein for receiving the jaws when said other part engages said one part whereby the jaws retain said parts in connected position, levers pivotally mounted on the arm for swinging movement about an axis coaxial with the axial bore, means on the levers operatively engaging the jaws on opposite sides of the axial bore whereby swinging movement of the levers moves said jaws, a pressure responsive member, means communicating the pressure responsive member with a source of differential fluid pressure for moving the pressure responsive member, and means connecting the pressure responsive member with the levers whereby application of fluid pressure to the pressure responsive member swings the levers to move the jaws apart and out of the groove in the post for releasing the parts for separation.

References Cited in the file of this patent

UNITED STATES PATENTS

| | | |
|---|---|---|
| 784,889 | Rittersbach | Mar. 14, 1905 |
| 2,372,943 | Fontaine et al. | Apr. 3, 1945 |
| 2,519,285 | Rhoads | Aug. 15, 1950 |
| 2,521,391 | Meents | Sept. 5, 1950 |
| 2,658,438 | Seng | Nov. 10, 1953 |